H. E. HUND & O. A. PEGAU.
VEHICLE TOP.
APPLICATION FILED AUG. 24, 1916.
1,281,574.
Patented Oct. 15, 1918.
2 SHEETS—SHEET 1.
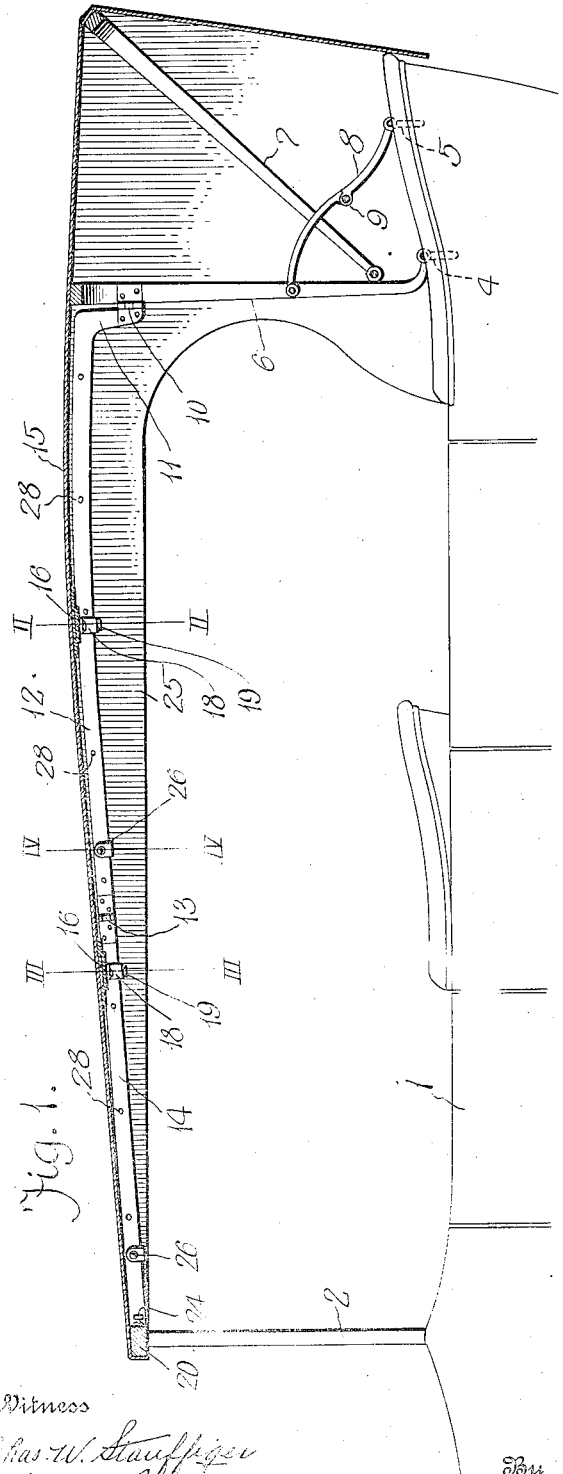
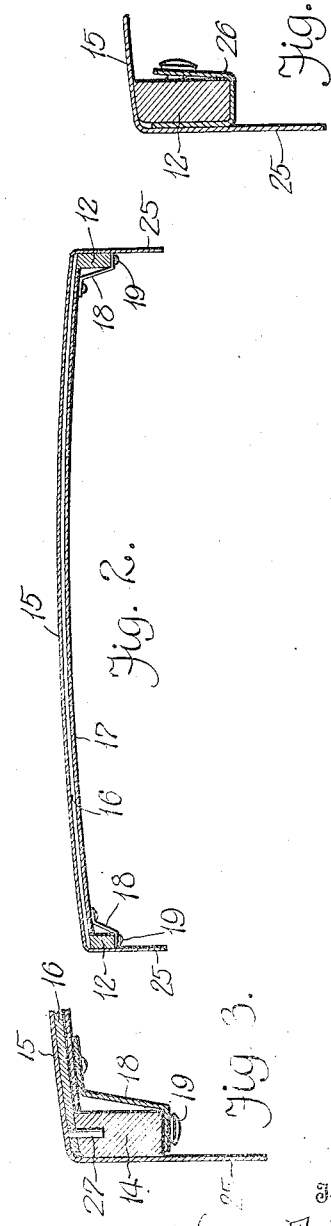
Inventor
Henry E. Hund,
Otto A. Pegau,

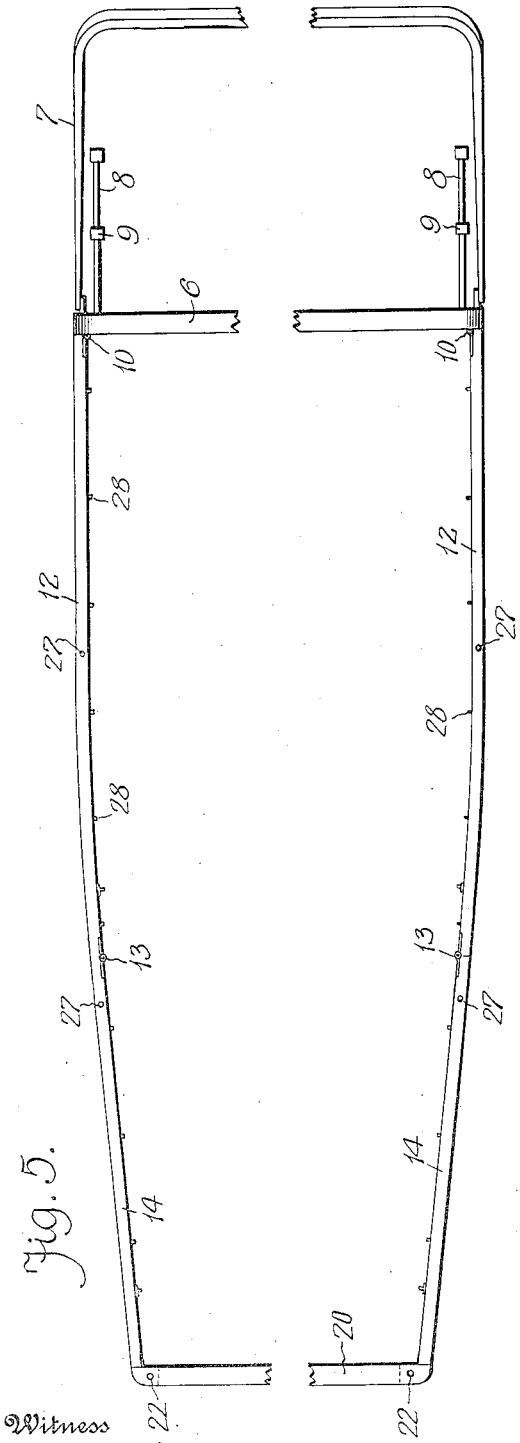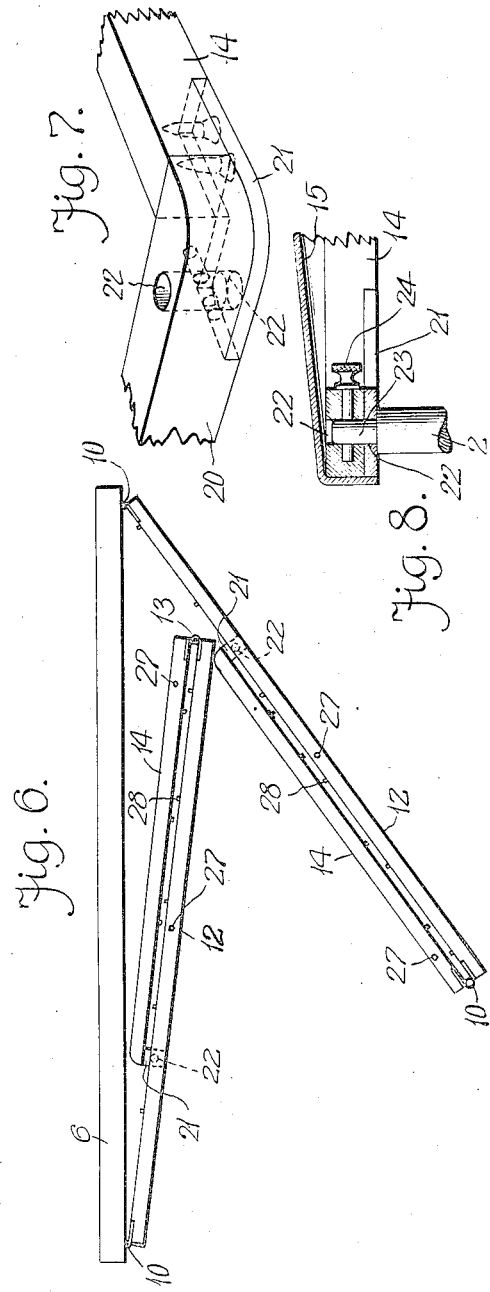

UNITED STATES PATENT OFFICE.

HENRY E. HUND AND OTTO A. PEGAU, OF DETROIT, MICHIGAN, ASSIGNORS TO BRIGGS MANUFACTURING COMPANY, OF DETROIT, MICHIGAN, A CORPORATION OF MICHIGAN.

VEHICLE-TOP.

1,281,574.　　　　Specification of Letters Patent.　　Patented Oct. 15, 1918.

Application filed August 24, 1916.　Serial No. 116,706.

*To all whom it may concern:*

Be it known that we, HENRY E. HUND and OTTO A. PEGAU, citizens of the United States of America, residing at Detroit, in the county of Wayne and State of Michigan, have invented certain new and useful Improvements in Vehicle-Tops, of which the following is a specification, reference being had therein to the accompanying drawings.

This invention relates to vehicle tops, and more particularly to a novel collapsible automobile top, which will provide a rigid structure when set up and may be easily and quickly collapsed to occupy a comparatively small space at the rear end of an automobile body.

Our invention aims to provide a top of the above type which may be advantageously used in connection with a long automobile body, without having the framework of the top obstruct vision or interfere with persons entering the automobile or leaving the same.

Our invention further aims to provide an automobile top which has the appearance of a permanent set up top, yet being collapsible. To this end, we have put into practice a novel arrangement of bows constituting a support for a canopy or cover which may be bodily removed relative to the bows or framework, and in consequence of this arrangement, the entire top may be easily manipulated when being extended or folded. Our invention is further characterized by a top framework including bows that may be covered with a material similar to the canopy or cover, thus providing an interior top finish which will present a neat appearance and harmonize with the upholstery or the interior finish of an automobile body.

Our invention still further aims to accomplish the above by an automobile top wherein the parts are constructed with a view of reducing the cost of manufacture and at the same time retain the features by which durability, rigidity and ease of assembling are secured, and with such ends in view our invention resides in the novel construction to be hereinafter described and then claimed.

Reference will now be had to the drawing, wherein

Figure 1 is a longitudinal sectional view of an automobile top in accordance with our invention;

Fig. 2 is a cross sectional view taken on the line II—II of Fig. 1;

Fig. 3 is a similar view taken on the line III—III of Fig. 1;

Fig. 4 is a similar view taken on the line IV—IV of Fig. 1;

Fig. 5 is a plan of the framework or bows of an automobile top, partly broken away;

Fig. 6 is a similar view of a portion of the top, partly folded;

Fig. 7 is a perspective view of a portion of the top, and

Fig. 8 is a detailed sectional view of a wind-shield connection.

In describing our invention by aid of the views above referred to, we desire to point out that the same are intended as merely illustrative of the vehicle top as now in use, and we do not care to confine ourselves to the precise construction and arrangement of parts shown. The following description is therefore to be broadly construed as including substitute constructions and arrangement of parts which are the obvious equivalent of those to be hereinafter referred to.

In the drawings, 1 denotes a portion of an automobile body having a windshield 2 and side irons 4 and 5. Pivotally connected to the irons 4 in the usual and well known manner is a vertical or front bow 6 and connected to said vertical or front bow, adjacent the ends or sockets thereof, is a rear or inclined bow 7. At the inner sides of the bows 6 and 7 there are break-up braces 8, said braces having the ends thereof pivotally connected to the inner sides of the bows 6 and to the side irons 5. With these braces provided with ordinary rule joints 9, said braces can be folded whereby the bows 6 and 7 can be lowered rearwardly into parallelism to rest upon the rear end of the body 1 or top rests provided therefor.

Hinged or pivotally connected to the vertical or front bow 6, adjacent the top thereof, as at 10, are the depending ends 11 of side bows 12. Hinged or pivotally connected, as at 13, to the forward ends of the side bows 12 are outrigger bows 14. These bows, as shown, may be slightly curved or bowed in a vertical plane and the side bows 12 are disposed to fold inwardly, said bows being of a less length than the width of the vertical or front bow 6. The outrigger bows 14 are hinged to fold inwardly, as best shown in Fig. 6, and said outrigger bows represent a continuation of the side bows 12, with both sets of bows corresponding somewhat to the ordinary horizontal outrigger bow of an automobile top.

The bows 6, 7, 12 and 14 coöperate in providing a framework adapted to support a canopy or cover 15 which is connected to the rear end of the automobile body 1 in the usual and well known manner. At intervals throughout the length of the cover 15 there are flat strips 16 inclosed by cases or casing 17 with the ends of the strips exposed to rest upon the bows 12 and 14, as best shown in Fig. 2. The flat strips 16 constitute transverse members which may be slightly bowed and the ends of the cases 17 are provided with straps 18 detachably connected to the lower faces of the bows 12 and 14, as at 19. Ordinary stud and socket members, somewhat similar to a glove clasp, may be employed for this purpose. At the forward end of the cover 15 there is a rigid transverse member 20 adapted to engage the front ends of the outrigger bows 14 and rest upon corner plates or pieces 21 carried by the outrigger bows 14. The corner pieces 21 and the ends of the transverse member 20 are provided with alining openings 22 to receive windshield studs 23, thus utilizing the windshield 2 for holding the forward end of the automobile top against lateral displacement. Pins 24 or similar fastening means may be employed for holding the transverse member 20 against vertical displacement relative to the windshield studs 23.

By reference to Fig. 1, it will be observed that the overhanging portion of the cover 15 has depending side walls or flaps 25 and these side walls or flaps, at certain intervals and preferably at the forward end of the cover, may be connected to the bows 12 or 14 by straps 26 (see Fig. 4).

As shown in Fig. 3, the ends of the strips or transverse member 16 may be detachably connected to the bows 12 and 14 by studs or dowel pins 27 which will assist in maintaining the transverse members slightly bowed.

In practice, we provide the inner sides of the bows 12 and 14 with studs or socket members, constituting fasteners 28 that will permit of side curtains being suspended from the bows to coöperate with the cover 15 and the windshield 2 in inclosing the upper portion of the vehicle body 1.

We attach considerable importance to the articulation to the bows 12 and 14 relative to the vertical or front bow 6, as the bows 12 and 14 may be easily folded and together with the bows 6 and 7 can be suitably covered to present a neat and attractive appearance from the interior of the automobile. It is apparent that by releasing the straps 18 and 26, together with the transverse member 20, the cover 15 can be shifted rearwardly the bows 12 and 14 folded, and lowered with the bows 6 and 7, to a collapsed position; the cover 15 being folded to lay between the bows 6 and 7. All this is accomplished without stepping out of the automobile, and the top is readily raised or extended. Other advantages of our invention will be apparent to those skilled in the manufacture and use of automobile tops and we would have it understood that the principle involved in our invention is applicable to tops of various sizes or different makes of automobile.

In using the term "bows" it is to be understood that said terms includes metal sockets, wooden bows, flat metal bars, rods, spacers and such parts as are common to tops as generally known and correctly proportioned for folding.

What we claim is:—

The combination with an automobile body, of a vertical bow supported thereby and having its ends pivotally connected to said automobile body and adapted to be swung downwardly on said body, means connecting said automobile body and said vertical bow adapted to maintain said bow firmly in a vertical plane, side bows having depending ends connected to said vertical bow adjacent the top thereof, and extending at a tangent to the bowed portion of said vertical bow and adapted to be swung inwardly, outrigger bows connected to said side bows as a prolongation thereof and adapted to be swung inwardly, a cover adapted to be supported by said vertical, side and outrigger bows, a transverse member at the forward end of said vertical bow adapted to be held at the forward ends of said outrigger bows, transverse members carried by said cover and adapted to rest upon the upper edges of said side and outrigged bows, and means adapted for detachably connecting said cover to said side and outrigger bows.

In testimony whereof we affix our signatures in presence of two witnesses.

HENRY E. HUND.
OTTO A. PEGAU.

Witnesses:
EDWARD J. TOOMEY,
LAURA HUNTER.